United States Patent
Busse et al.

(10) Patent No.: US 8,485,309 B2
(45) Date of Patent: Jul. 16, 2013

(54) APPARATUS AND METHOD FOR IMPROVING THE DAMPING OF ACOUSTIC WAVES

(75) Inventors: Stefan Busse, Berlin (DE); Claus Heuwinkel, Berlin (DE); Lars Enghardt, Berlin (DE); Ingo Röhle, Göttingen (DE)

(73) Assignee: Deutsches Zentrum fur Luft-und Raumahrt E.V., Cologne (DE)

( * ) Notice: Subject to any disclaimer, the term of this patent is extended or adjusted under 35 U.S.C. 154(b) by 232 days.

(21) Appl. No.: 12/668,630

(22) PCT Filed: Jul. 10, 2008

(86) PCT No.: PCT/EP2008/006068
§ 371 (c)(1),
(2), (4) Date: Jul. 13, 2010

(87) PCT Pub. No.: WO2009/007138
PCT Pub. Date: Jan. 15, 2009

(65) Prior Publication Data
US 2010/0276225 A1    Nov. 4, 2010

(30) Foreign Application Priority Data

Jul. 11, 2007 (DE) .......... 10 2007 032 600

(51) Int. Cl.
*F01N 1/06* (2006.01)
*G10K 11/175* (2006.01)
*F01N 1/00* (2006.01)
*G10K 11/16* (2006.01)

(52) U.S. Cl.
USPC .......... 181/206; 181/250; 381/71.2; 381/71.5

(58) Field of Classification Search
USPC . 181/198, 206, 250, 266, 273, 276; 381/71.1, 381/71.2, 71.5, 71.7
See application file for complete search history.

(56) References Cited

U.S. PATENT DOCUMENTS

| | | | | |
|---|---|---|---|---|
| 4,527,282 A | * | 7/1985 | Chaplin et al. | 381/71.5 |
| 4,665,549 A | * | 5/1987 | Eriksson et al. | 381/71.5 |
| 5,097,923 A | * | 3/1992 | Ziegler et al. | 181/206 |
| 5,201,649 A | | 4/1993 | Aoki et al. | |
| 5,229,556 A | * | 7/1993 | Geddes | 181/206 |
| 5,257,316 A | * | 10/1993 | Takeyama et al. | 381/71.5 |
| 5,272,286 A | * | 12/1993 | Cain et al. | 181/206 |
| 5,380,190 A | | 1/1995 | Kumagai | |

(Continued)

FOREIGN PATENT DOCUMENTS

| | | |
|---|---|---|
| DE | 38 16 921 | 11/1989 |
| DE | 195 28 570 | 2/1997 |

(Continued)

*Primary Examiner* — Edgardo San Martin
(74) *Attorney, Agent, or Firm* — Jordan IP Law, LLC; Todd A. Vaughn

(57) ABSTRACT

An apparatus for damping acoustic waves that includes a volume of fluid having actively excited acoustic waves, an enclosure disposed in the volume of fluid including delimiting surfaces which define a cavity, at least one of the delimiting surfaces being permeable to the fluid, such that fluid may be exchanged between the cavity and the volume, and at least one sound producer disposed proximate the cavity to actively excite the actively excited acoustic waves in the fluid disposed in the cavity such that acoustic waves are damped in the volume.

23 Claims, 1 Drawing Sheet

U.S. PATENT DOCUMENTS

| | | | |
|---|---|---|---|
| 5,446,249 A * | 8/1995 | Goodman et al. | 181/206 |
| 5,457,749 A * | 10/1995 | Cain et al. | 381/71.5 |
| 5,511,127 A * | 4/1996 | Warnaka | 381/71.5 |
| 5,513,266 A * | 4/1996 | Zuroski | 381/71.5 |
| 5,541,373 A * | 7/1996 | Cheng | 181/206 |
| 5,600,106 A | 2/1997 | Langley | |
| 5,619,020 A * | 4/1997 | Jones et al. | 181/206 |
| 5,655,361 A | 8/1997 | Kishi | |
| 5,693,918 A * | 12/1997 | Bremigan et al. | 181/206 |
| 6,160,892 A | 12/2000 | Ver | |
| 6,385,321 B1 * | 5/2002 | Krueger et al. | 381/71.7 |
| 6,461,144 B1 | 10/2002 | Gutmark et al. | |
| 6,963,647 B1 | 11/2005 | Krueger et al. | |
| 7,293,627 B2 * | 11/2007 | Kruger et al. | 181/206 |
| 7,533,759 B2 * | 5/2009 | Krueger et al. | 181/206 |

FOREIGN PATENT DOCUMENTS

| | | |
|---|---|---|
| DE | 101 03 942 | 5/2002 |
| DE | 10 2005 059 184 | 9/2007 |
| EP | 0916 817 | 5/1999 |

* cited by examiner

APPARATUS AND METHOD FOR IMPROVING THE DAMPING OF ACOUSTIC WAVES

CROSS REFERENCE TO PRIOR APPLICATION

The present application claims priority under 35 U.S.C. 119 and 35 U.S.C. 365 to German Patent Application No. 10 2007 032 600.0 (filed on Jul. 11, 2007), and PCT Application No. PCT/EP2008/006068 (filed on Jul. 10, 2008), which are all hereby incorporated by reference in their entirety.

BACKGROUND

The invention relates to a method and an apparatus for damping acoustic waves, that are to be damped, in a fluid that is disposed in a volume. The invention especially relates to damping using an apparatus that includes a cavity that is enclosed by delimiting surfaces, at least one of the delimiting surfaces being permeable to fluid, in order to enable fluid to be exchanged with the volume.

Acoustic waves, e.g. sound waves, occur at many locations in the environment. Materials and structures for acoustic damping that have the ability to weaken acoustic waves using energy dissipation are needed keep sound propagation in check in terms of noise protection and are also needed to reduce sound propagation in technical systems. This latter item can be important e.g. for mensuration applications in order for instance to produce a so-called low-reflection room or to suppress undesired technical phenomena that occur due to fluctuations in acoustic pressure. One very important example of the latter phenomenon are thermoacoustic vibrations in combustion chambers, in particular in combustion chambers in turbo-engines, such as for instance jet engines and gas turbines.

In many areas of applications, perforated surface linings are used for damping acoustic waves. They are generally embodied as flat double-walled structures, one wall being provided with apertures. These apertures open into a cavity that is disposed between the two walls or into a plurality of small cavities if there is a honeycomb-like structure between the walls. This arrangement is able to weaken acoustic waves, i.e. sound fields, on the side that is perforated.

Frequently there is an acoustic damping material, instead of the honeycomb-like structure, in apparatus for sound damping that are installed in buildings or that are used in noise protection walls. Such apparatus for sound damping are also used in fan engines and stationary gas turbines; in these cases they are generally called "liners". Liners have a number of embodiments. They are employed for acoustic damping e.g. in combustion chambers upstream of or in the intake or bypass to engines.

In particular the very strong combustion fluctuations that are caused in particular by a feedback mechanism of combustion instabilities with acoustic resonances and that are primarily standing wave fields frequently occur in so-called low NO burners that are optimized for low nitrogen oxide emissions. Because of the high repetition rates for the acoustic cycles, when there is flow or combustion-induced excitation of the system in the vicinity of a natural frequency of the combustion chamber there is an excited resonance in the combustion chamber. It is characteristic of standing wave fields that are embodied in spatially delimited combustion chambers that they have very strong pressure fluctuation amplitudes e.g. at the combustion chamber closure or at the turbine intake. If the damping is inadequate, the loads that occur here at the combustion chamber wall can lead to deformation of the combustion chamber wall or, worst case, to the destruction of the combustion chamber.

EP 0 702 141 A2 for instance describes a wall arrangement for an exhaust gas nozzle in an ultrasonic jet turbine in which a sound-absorbing element that comprises a porous plate and a honeycomb structure or a porous plate and a torus core is arranged between a nozzle plate and a liner. Cooling air is caused to flow along an interior surface of the nozzle plate and to flow through apertures in the porous plate against the liner.

Known from EP 1 762 786 A1 is a method for damping thermoacoustic vibrations by means of a resonator that has a resonator volume, thermoacoustic vibrations being induced in a cavity that tends towards thermoacoustic vibrations and at least some of the thermoacoustic vibrations being removed from the cavity and added to the resonator volume, damping vibrations being produced in the resonator volume, which damping vibrations are tuned to the thermoacoustic vibrations, at least some of the damping vibrations being added to the cavity such that the damping vibrations and the thermoacoustic vibrations overlap in an overlap area, and the vibrations largely cancel one another in the overlap area. Furthermore described is an apparatus for damping thermoacoustic vibrations in the vibration-capable cavity, which apparatus includes a resonator having a resonator volume and a cavity such that the cavity is joined via a decoupling line to the resonator volume and in which the decoupling line has an adjusting device by means of which a thermoacoustic vibration in the decoupling line can be influenced and in which another resonator tube connects the resonator volume to the cavity. The cavity is preferably a combustion chamber, in particular that of a gas turbine. The resonator is a so-called Helmholtz resonator. The latter is distinguished in that the resonantly excited vibrations therein are excited or produced by the sound waves that are produced in the volume to be damped. Even if in the described apparatus a resonance frequency of the damping vibrations can be influenced via the adjusting device by a longitudinal displacement of the decoupling line, such a Helmholtz resonator can only weaken acoustic vibrations by the resonance frequency of the resonator in a very narrow frequency band.

Known from patent application DE 10 2005 059 184, not laid open, is an apparatus for damping thermoacoustic resonances in combustion chambers that includes a combustion chamber, at least one at least partially hollow cylindrical injection element that is coaxial with the combustion chamber being provided that has a plurality of nozzle apertures spaced apart from one another, and a fluid for dissipating vibration energy that occurs during the combustion process flowing into the combustion chamber through the nozzle openings as a free jet having at least one radial component. Thus DE 10 2005 059 184 describes that the vibrations can be damped when an element that is embodied partially as a hollow cylinder and that surrounds the cylindrical combustion chamber has, on a limiting surface of the combustion chamber, nozzle openings through which a fluid is caused to flow in. In order to use this effect, however, some of the fluid that was compressed by the turbo-engine must be used and is thus no longer available for other processes, such as combustion or increasing thrust. The method described therein is therefore always associated with a certain loss of energy that is not negligible. The method thus significantly reduces the efficiency of the machine.

Nor do other applications in the field of noise protection outdoors and in buildings provide adequate acoustic damping. Acceptance in the general population of techniques and technologies that primarily produce noise cannot be increased unless noise propagation can be limited using improved methods and apparatus for damping.

SUMMARY

The underlying technical problem of the present invention is therefore to create an improved apparatus and an improved method for damping acoustic waves, especially for damping thermoacoustic resonances in engines.

This technical problem is inventively solved using the subject-matter in claims 1 and 12. Additional advantageous embodiments of the invention result from the subordinate claims.

The invention is based on the understanding that a structure embodied with double walls, of which one wall is configured to be permeable to fluid and for instance is perforated, can cause appreciable damping of acoustic waves in a volume adjacent to the fluid-permeable wall if acoustic vibrations or waves are actively excited in a cavity of the double-walled structure. The damping extends not only to the frequency range of the acoustic vibrations excited in the cavity (actively excited acoustic waves), but also across a wide frequency range. The excitation occurs regardless of the exact frequency or phase of the acoustic waves or sound to be damped. The effect is not based on intentional triggering using sound signals with opposing phases. In particular, what is proposed is an apparatus for damping acoustic waves, that are to be damped, in a fluid that is disposed in a volume, which apparatus includes a cavity enclosed by delimiting surfaces, at least one of the delimiting surfaces being permeable to fluid, in order to enable fluid to be exchanged with the volume, at least one sound producer being arranged in or at the cavity in order to excite actively excited acoustic waves in the fluid that is disposed in the cavity such that the acoustic waves are damped in the volume. In terms of their phase and frequency, the excited acoustic waves are not directly dependent, especially via a control circuit, on the acoustic waves to be damped. In a method for damping acoustic waves, that are to be damped, in a fluid disposed in a volume by means of a damping apparatus that includes a cavity enclosed by delimiting surfaces, one of the delimiting surfaces being permeable to fluid, in order to enable fluid to be exchanged with the volume, actively excited acoustic waves are produced or excited, by means of a sound producer, in the fluid disposed in the cavity such that the acoustic waves that are to be damped are damped in the volume. The actively excited acoustic waves can preferably be adapted to the cavity but can still be selected regardless of the acoustic waves in the volume that are to be damped. The actively excited acoustic waves are unrelated to the frequency and phase of the acoustic waves to be damped. In this context, unrelated to frequency and unrelated to phase means that there is no exact frequency coupling or phase coupling to one frequency or phase for the waves to be damped. As a rule the amount of energy required for producing the actively excited acoustic waves is very low. When employed in a gas turbine or aircraft jet engine, the energy required for producing the actively excited acoustic waves is negligible compared to the energy available for the engine.

The apparatus for damping is preferably arranged such that the fluid-permeable delimiting surface is a limiting surface for the volume. This makes possible for the apparatus to directly damp the acoustic waves in the volume that are to be damped.

The fluid-permeable delimiting surface is a material structure that has recesses, apertures, or the like in order to permit fluid to pass through the material structure. The material structure can also be a porous, permeable material.

Use of the inventive apparatus is suitable not only in engines and gas turbines, but also inside and outside of buildings for damping sound waves, i.e. acoustic waves of every type.

The actively excited acoustic waves are preferably produced or excited mono-frequently. I.e., an excitation wave, for instance a sinus wave, is produced and/or excited in a regular temporal sequence. The frequency is preferably adapted to a geometric shape for the cavity. This selection is essentially unrelated to the frequency spectrum for the sound waves in the volume that are to be damped. The selected frequency for the actively excited, preferably mono-frequent acoustic waves is preferably different from a frequency at which a maximum sound intensity level occurs in the frequency spectrum of the acoustic waves to be damped.

One or a plurality of electrically driven sound producing elements can be used as the sound producer. One preferred embodiment of the invention provides that the sound producer includes a driven sound producing element, especially a loud speaker, an ultrasonic transducer, and/or a piezo element. All of these aforesaid apparatus are able to convert electrical energy into acoustic waves in a fluid or to excite acoustic waves in a fluid. A sound producer that includes an electrically driven sound producing element offers the advantage that it is simple to produce the sound. The desired frequency can vary across a wide range of frequencies. For instance, a loud speaker can excite acoustic waves in at least the entire audible frequency range. Electrical signals that are required for supplying this sound producing element can be produced in a simple manner by means of electronic switches and if necessary can be amplified.

At locations at which there is a flow of fluid, however, the flow of fluid can also be used to actively excite acoustic sound waves. For instance, in a gas turbine or in particular in a fan engine for an aircraft, all or part of a flow of fluid flowing in a bypass can be used for actively exciting acoustic waves in the cavity. In one preferred embodiment, the at least one sound producer therefore includes (alternatively or in addition to for instance an electrically driven sound producing element) an aerophonic sound producing element, in particular one or a plurality of tongues that are able to vibrate or an element that divides a fluid flow that produces a sound. All sound producing elements whose sound producing mechanism is produced by a flow of fluid, in particular a gaseous flow, are called aerophonic sound producing elements. Numerous options for producing sound waves using a flow of fluid are known from the prior art. Different mechanisms are used. One of these mechanisms is based on periodically interrupting the flow. This can be accomplished for instance using one or a plurality of tongues that can vibrate or other elements that can vibrate. Another sound producing mechanism is based on dividing a flow that passes over a dividing element. The flow breaks up at the element that divides the flow so that acoustic waves are excited. In embodiments in which the actively excited acoustic waves are excited by means of a flow of fluid that exists anyway, the energy needed for producing the excited acoustic waves is especially low.

With aerophonically produced, actively excited acoustic waves, when the sound producing element is arranged in or at the cavity what is generally attained is that a cavity resonance is excited in the cavity, and this cavity resonance itself causes feedback on a non-stationary separation process at the aerophonic sound producing element, which feedback leads to embodying the cavity resonance as a stationary or continuous condition. Exciting acoustic waves that excite a cavity resonance in the cavity has proved particularly advantageous because this means that particularly high damping of the acoustic waves is attained in the volume. This applies not only to acoustic waves that have a frequency that corresponds to the resonance frequency of the cavity resonance, but also to acoustic waves in a wide range of frequencies. Likewise, it is advantageous that, relative to the energy required for excitation when exciting a cavity resonance, a particularly high sound level can be achieved for the actively excited acoustic waves in the cavity. The cavity resonance or resonances are a function of the geometric features of the cavity. These features can change for instance if the fluid is heated and/or if the walls or delimiting surfaces are heated. In order to thus be able to excite and maintain a cavity resonance in the cavity even in embodiments that use an electrically driven sound producing element, in one preferred embodiment it is provided that the at least one sound producer is linked to a control unit and at least one sound sensor for detecting acoustic waves is connected to the control unit and the control unit controls the at least one sound producer as a function of the measurement signals from the at least one sound sensor in order to excite a cavity resonance or a pre-specified frequency. Preferably the at least one sound sensor is arranged in the cavity and the control unit is embodied by means of which to excite the actively excited acoustic waves.

In order to be able to cool the fluid-permeable delimiting surface when it is used as the limiting surface of a combustion chamber volume in which the acoustic waves are to be damped, it is advantageous when the cavity includes at least one inlet aperture in order to make it possible to introduce fluid via the inlet aperture into the cavity and to enable the fluid to flow out through the fluid-permeable delimiting surface.

In one embodiment it is provided that the cavity is divided into at least two smaller cavities by means of at least one additional fluid-permeable wall, the actively excited acoustic waves being produced in at least one of the two smaller cavities. The division of the smaller cavities occurs such that the fluid-permeable delimiting surface and the at least one other fluid-permeable wall are essentially parallel to one another. "Essentially parallel" in this context is intended to express that, at almost any point on the fluid-permeable delimiting surface, a normal to the fluid-permeable delimiting surface and that is oriented towards the interior of the cavity intersects the at least one additional fluid-permeable delimiting surface at an angle of 90° or approximately 90°. If the fluid-permeable delimiting surface is a rotational body with respect to an axis or is a part thereof, the at least fluid-permeable one wall will also be a rotational body with respect to the same axis of rotation or will be a part of a rotational body.

In one refinement of the invention it is provided that at least one additional sound producer is arranged at or in one of the at least two smaller cavities so that different or similarly actively excited acoustic waves can be produced in the at least two smaller cavities. In this manner it is possible to excite different cavity resonances that do not have to be "harmonic" with one another since the smaller cavities can have different dimensions.

In the preferred embodiment of the invention, the volume is essentially elongated in a rotationally symmetrical manner and along an axis of symmetry and the fluid can flow along a main flow direction of a fluid, the main flow direction being essentially parallel to the direction of the axis of symmetry, and the cavity delimiting the volume radially at least in one radial sector by means of the fluid-permeable delimiting surface, the sound producer being arranged in or at the cavity at the upstream or downstream end of the cavity. Such an arrangement is particularly suitable for damping a combustion chamber on a gas turbine or on an engine for an aircraft.

In one preferred refinement it is provided that the fluid-permeable delimiting surface includes apertures, preferably circular apertures, arranged on a circle or circular arc oriented perpendicular to the axis of symmetry. In an arrangement for acoustic damping of acoustic waves in an engine or gas turbine, the apparatus is preferably embodied as a hollow rotational body, especially a hollow cylindrical rotational body, the apertures being arranged on a ring, the ring preferably being arranged at a position of a pressure antinode and the cavity resonance. If for instance a "8/2 standing wave field" is embodied in the cavity, in which a distance L between the upstream end and the downstream end of the cavity equals half the wavelength 8 of the cavity resonance (8/2=L), the pressure antinode is located half-way between the upstream end and the downstream end of the cavity. By appropriately arranging the sound producer or sound producing elements on the upstream or downstream end of the cavity or even at a different location, for instance on another delimiting surface, what can be attained is that a resonant standing wave field is embodied in the cavity for instance between the upstream end and the downstream end of the cavity, i.e. axially.

In order to excite actively excited acoustic waves in the cavity or in one of the smaller cavities, of which there can be more than two, a plurality of sound producing elements or even a plurality of sound producers can be arranged in the cavity or in the corresponding smaller cavity. They are preferably arranged such that a cavity resonance, which as is known can have different characteristics, can be excited optimally. For a cavity that is embodied in the interior of a double-walled cylinder and is provided for damping acoustic waves, that are to be damped, in a volume enclosed by the cylinder, a plurality of sound producing elements (for instance loud speakers) of one or a plurality of sound producers are preferably arranged on the end faces or other delimiting surfaces of the cavity in order to excite or produce actively excited acoustic waves between the peripheral surfaces of the cavity.

In particular when a length of the cavity along the fluid-permeable combustion surfaces is more than perpendicular thereto (for instance a recess along the cylinder axis is longer than a radial length of the cavity in a cavity embodied in a double-walled hollow cylinder), the end faces of the cavity can be omitted, entirely or in part, if adequate excitation of actively excited acoustic waves in the cavity is possible.

The technical features of the inventive method have the same advantages as the corresponding features of the inventive apparatus.

The invention shall be explained in greater detail in the following using preferred embodiments.

DRAWINGS

DESCRIPTION

Figure 1:
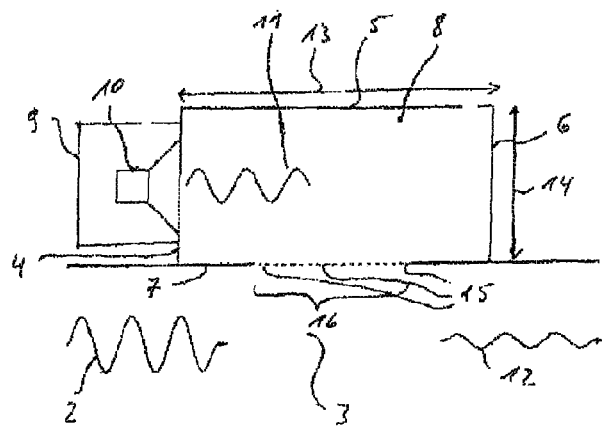
FIG. 1 is a schematic representation of an apparatus for damping acoustic waves.

FIG. 1 is a schematic representation of an apparatus 1 for damping acoustic waves 2 in a volume 3. The apparatus 1 includes a cavity 8 surrounded by delimiting surfaces 4-7. At least one of the delimiting surfaces 4-7 (delimiting surface 7 in the example depicted) is embodied permeable to fluid in order to permit fluid exchange between the cavity 8 and the volume 3. The other delimiting surfaces 4-6 are essentially embodied rigid. Arranged at the cavity 8 is a sound producer 9 that includes a sound producing element 10 embodied as a loud speaker. This sound producing element 10 is arranged at the cavity 8 such that actively excited acoustic waves 11 can be actively excited in a fluid that is disposed in the cavity 8. The delimiting surface 4-7 at which the sound producer 9 is arranged is configured appropriately. For instance, a recess can be provided in the corresponding delimiting surface 4. Likewise, it is possible for the corresponding delimiting surface 4 to be perforated. An incident wave 2 that is in the volume 3 and is to be damped and runs along or strikes the fluid-permeable delimiting surface 7 is damped by a fluid exchange between the volume 3 and the cavity 8 and becomes a damped acoustic wave 12.

What is critical is that a frequency of the actively excited acoustic wave 11 in the cavity 8 does not have to match the acoustic wave 2 that is in the volume 3 and that is to be damped. On the contrary, an actively excited acoustic wave 11 can damp acoustic waves 2 that are in the volume 3 and that are to be damped in a broad spectrum of frequencies. The actively excited acoustic wave 11 is unrelated to the frequency and phase of the waves 2 to be damped.

A particularly good damping effect in the volume 3 is obtained when a cavity resonance is excited in the cavity 8 by means of the actively excited acoustic waves 11. In this case, as well, it is not only acoustic waves 2 that are to be damped and that are at a frequency in the range of the cavity resonance that are "coupled" to the cavity resonance and damped using the fluid exchange, but rather acoustic waves 2 that are to be damped are damped in a wide frequency spectrum.

In order to make sure that no dominant frequency is excited in the frequency spectrum, i.e. a frequency having a particularly high sound intensity level, the cavity is configured such that it is possible to excite therein cavity resonances that have a resonance frequency that differs from this one or plurality of dominant frequencies. Likewise such a different resonance frequency is preferably excited in order to ensure that no sonic energy can be coupled into this/these already dominant frequency/frequencies.

The cavity 8 is preferably configured such that a length 13 along the fluid-permeable delimiting surface 7 is longer than a perpendicular length 14 perpendicular to this fluid-permeable delimiting surface 7. However, other geometric configurations of the cavity are also possible. The fluid-permeable delimiting surface 7 is preferably a limiting surface for the volume 3. In other embodiments in which the length 13 is much longer than the perpendicular length 14, one or both delimiting surfaces 4, 6 can be entirely or partially omitted or embodied permeable to fluid.

The fluid-permeable delimiting surface 7 does not have to be permeable to fluid along its entire length. On the contrary, it can be advantageous for the fluid-permeable delimiting surface 7 to have individual apertures 15 along the length 13, preferably in a section 16 in which a pressure antinode of a cavity resonance forming in the cavity is disposed.

Figure 2:
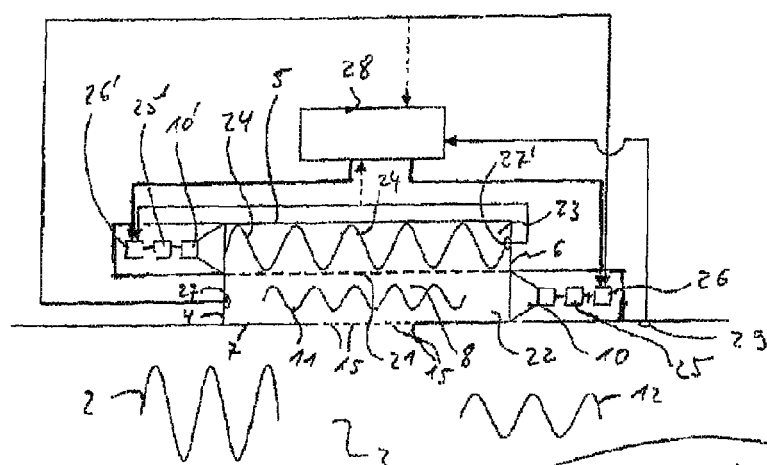
FIG. 2 is another schematic representation of an embodiment of an apparatus for damping acoustic waves; and, FIG. 3 is a schematic representation of a jet engine having an apparatus for damping acoustic waves in the area of a combustion chamber.

FIG. 2 depicts another embodiment of an apparatus 1 for damping acoustic waves 2 in a volume 3. Identical technical features are identified with the same labels. In this embodiment, the cavity 8 is divided into smaller cavities 22, 23 by a fluid-permeable wall 21 or fluid-permeable delimiting surface. The fluid-permeable wall 21 can be embodied similar or identical to the fluid-permeable wall 7. However, it can also have more or fewer apertures and can have apertures that have a different shape and size and at other locations than the fluid-permeable delimiting surface 7 for the cavity 8. In any case, the apparatus is embodied such that actively excited acoustic waves can be excited or generated in at least one of the smaller cavities 22, 23. In the embodiment depicted, actively excited acoustic waves 11 can be excited in the smaller cavity 22 and additional actively excited acoustic waves 24 can also be excited or produced in the smaller cavity 23. To this end arranged at one delimiting surface 6 of the cavity 8 is a sound producer 9. It includes as the sound producing element 10 a loud speaker that can excite or produce the actively excited acoustic waves 11 in the smaller volume 22. The sound producer 9 includes for this a sound generator 25. The sound generator 25 will preferably be an electronic circuit that can be controlled to generate a desired sound signal for exciting the actively excited acoustic waves. The generator 25 is controlled by means of a control unit 26. Furthermore arranged in the smaller cavity 22 is a sound sensor 27 that is embodied for measuring acoustic waves. Signals from the sound sensor 27 can be evaluated by the control unit 26 of the sound producer 9 in order to control the generator 26 such that a cavity resonance for the smaller cavity 22 is excited by means of the sound producing element 10 embodied as a loud speaker. Similarly, there is a sound producer 9', also with a sound producing element 10' embodied as a loud speaker, a generator 25', and a control unit 26', for the smaller cavity 23. A sound sensor 27' is also arranged in the smaller cavity 23 in order to detect the additional actively excited acoustic waves 24 in the smaller cavity 23.

The apparatus 1 can furthermore include a central control unit 28 that controls the sound producers 9 and 9'. The central control unit 28 can evaluate signals from another sound sensor 29 that is arranged in or at the volume 3. Using this it is possible to evaluate the frequency spectrum of the sound waves 2. The cavity resonances to be excited can be selected as a function of the results of the evaluation. This can ensure that the cavity resonance frequencies that are excited do not coincide with a dominant frequency in the frequency spectrum of the waves 2 to be damped. In addition or alternatively in other embodiments the signals can be sent from the sound sensors 27, 27' to the central control unit and evaluated there in order to check or monitor that the selected cavity resonances are being maintained. This is advantageous for instance when the fluid is heated in the smaller cavities 21, 22 or when there are thermal expansions of the smaller cavities 21, 22, which can occur for instance in gas turbines or jet engines. The sound sensors 27, 27' and the additional sound sensor 29 together with the central control unit are not used for regulating a frequency or phase in real time or adapted to the changing waves 2 in the volume 3 that are to be damped. There is no frequency coupling or phase coupling. On the contrary, preferably a mono-frequent active excitation of acoustic waves that is independent of the phase and frequency of the waves 2 to be damped occurs in the smaller cavities 21, 22. The mono-frequency actively excited acoustic wave 11 or additional acoustic wave 24 can have the same frequency or different frequencies. In such an embodiment the sound producers 9, 9' can have a control unit 26 or 26' or can be embodied without one so that the generators are triggered directly by the central control unit 28. In yet another embodiment the generators can also be integrated in the central control unit.

In other embodiments more smaller cavities in the cavity 8 can be provided. They are each separated from one another via a wall or delimiting surface that is permeable to fluid. The individual smaller cavities can have different dimensions or the same dimensions. The smaller cavities can be different from one another with respect to a perpendicular length 14' and with respect to their longitudinal length 13' and with respect to a transverse length (perpendicular to the plane of the drawing) that is perpendicular to the two aforesaid lengths. In other embodiments the sound producer and the sound producing element can also be arranged in the cavity or smaller cavity. Likewise, it is possible for a plurality of sound elements to be arranged in one cavity or smaller cavity in order to excite or produce actively excited acoustic waves.

Figure 3:
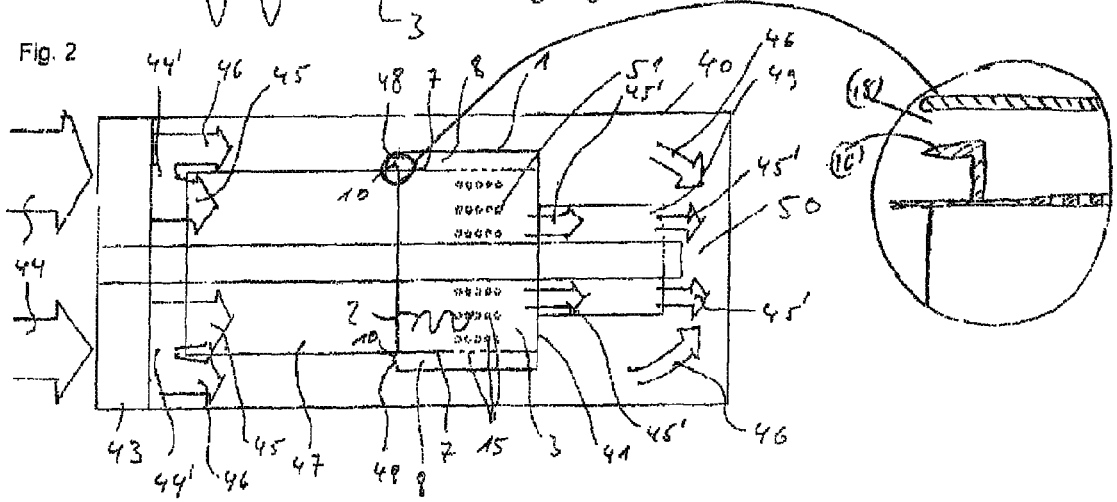

FIG. 3 provides a schematic representation of a fan engine 40 having an apparatus 1 for damping acoustic waves 2 in a combustion chamber 41. Fluid 44, as a rule air, flows into the fan engine 40 along a main flow direction 42 through an inlet into a first compressor stage 43. After the first compressor stage, the pre-compressed fluid 44' is divided into a main flow 45 and a bypass flow 46. The main flow 45 travels via a second compressor stage 47 into the combustion chamber 41, into which fuel is injected, in order to support a combustion reaction. Thermoacoustic resonances that occur represent acoustic waves 2 that are to be damped. Therefore, arranged around the combustion chamber 41 in this case is an apparatus 1 embodied as a double-walled hollow cylinder that is for damping the acoustic wave 2 and that is called the liner. The cavity 8 has at least one inlet 48 through which some of the bypass flow 46 can flow into the cavity 8 and can flow out into the combustion chamber 41 through the apertures 15 in the fluid-permeable delimiting surface 7 of the cavity 8. This flow is provided in order to cool the fluid-permeable delimiting surface 7 that is also a limiting surface for the combustion chamber 41, i.e. the volume 3, in which the acoustic waves 2 to be damped occur.

The apertures 15 are preferably arranged on one or a plurality of circles 51 or circular arcs, the center points of which are on the axis of symmetry of the fan engine 40. The number, size, arrangement, and geometry of the apertures 15 on the circles 51 can vary from circle to circle 51. The circles 51 are preferably arranged in segments at which pressure antinodes for the actively excited acoustic waves form in the cavity. The wall thickness of the fluid-permeable delimiting surface 7 can also vary.

Provided for the sound producing element 10 at the at least one inlet 48 is a lip or tongue for instance. It can be excited to vibrate by some of the bypass flow or by a division in the bypass flow. A non-stationary separation of the flow occurs, which causes active excitation of acoustic waves in the cavity 8. A cavity resonance forms in the cavity 8 and it is fed back to the non-stationary separation process so that a cavity resonance forms in the cavity 8. This happens regardless of changes in the cavity due to heating and expansion and regardless of any change in the fluid properties due to different compression and/or temperature and/or pressure. The apparatus 1 ensures that no thermo-acoustic resonances can form in the combustion chamber 41 or that they are at least damped strongly enough that there is no damage to the engine 40. The main flow 45' of the fluid, strongly heated and accelerated due to the combustion process, flows out of the combustion chamber 41 into a preferably multi-stage turbine 49 that drives the first compressor stage 43 and the second compressor stage 47. The main flow 45' and bypass flow 46 are mixed in an outlet area 50 embodied like a nozzle and exit from the engine 40 to provide thrust for the engine 40.

It is possible for a plurality of cavities 8 that are separate from one another to be embodied about the combustion chamber 41, each having only one angular area, i.e. one cylinder sector, for the fluid-permeable limiting surface for the volume 2. It is also possible for a plurality of cavities that are separated from one another to be embodied axially.

In embodiments in which the cavity is divided into smaller cavities, the latter can have different smaller volumes. In an embodiment adapted to a cylinder geometry, the smaller cavities can differ both in terms of axial and radial length in order to be able to excite different cavity resonances in the apparatus.

In a few embodiments, including the described embodiments, different sound producers or sound producing elements that work according to different principles can be provided for the cavity or a smaller cavity in order to be able to produce or excite the optimum actively excited acoustic waves in different operational conditions.

The embodiments described are merely exemplary embodiments. One skilled in the art will recognize that numerous embodiments of the invention are possible. The individual technical features described in conjunction with the different embodiments can be combined in any desired combination for implementing the invention.

Reference List
1 Apparatus for damping acoustic waves
2 Acoustic waves to be damped
3 Volume
4-6 Delimiting surfaces
7 Delimiting surface that is permeable to fluid
8 Cavity
9 Sound producer
10 Sound producing element
11 Actively excited acoustic waves
12 Damped acoustic waves
13, 13' Length along the fluid-permeable delimiting surface
14, 14' Perpendicular length
15 Apertures
16 Center area
21 Fluid-permeable wall
22, 23 Smaller cavities
24 Other actively excited acoustic waves
25, 25' Generator
26, 26' Control unit
27, 27' Sound sensor
28 Central control unit
29 Sound sensor
40 Fan engine
41 Combustion chamber
42 Main flow direction
43 First compressor stage
44, 44' Pre-compressed fluid flow
45, 45' Main flow
46 Bypass flow
47 Second compressor stage
48 Inlet
49 Turbine
50 Outlet area
51 Circles

The invention claimed is:
1. An apparatus for damping acoustic waves comprising:
a volume of fluid having actively excited acoustic waves;
an enclosure disposed in the volume of fluid including delimiting surfaces which define a cavity, wherein at least one of the delimiting surfaces is permeable to the fluid, such that fluid may be exchanged between the cavity and the volume; and
at least one sound producer disposed proximate the cavity to actively excite the actively excited acoustic waves in the fluid disposed in the cavity such that acoustic waves are damped in the volume, wherein the at least one sound producer is configured to excite the actively excited acoustic waves independent of the phase and frequency of the acoustic waves to be damped.

2. The apparatus of claim 1, wherein the fluid-permeable delimiting surface is a limiting surface for the volume.

3. The apparatus of claim 1, wherein the at least one sound producer is one of a loud speaker, an ultrasonic transducer, and a piezo element.

4. The apparatus of claim 1, wherein the at least one sound producer includes an aerophonic sound producing element including one of at least one tongue that can vibrate and an element that divides a fluid flow to produce a sound.

5. The apparatus of claim 2, further comprising:
at least one sound sensor for detecting acoustic waves; and
a control unit, linked to the sound producer and connected to the at least one sound sensor, wherein the control unit controls the at least one sound producer as a function of measurement signals from the at least one sound sensor in order to excite a cavity resonance by means of the actively excited acoustic waves.

6. The apparatus of claim 1, wherein the at least one sound producer is configured to monofrequently excite the actively excited acoustic waves independent of the phase and frequency of the acoustic waves to be damped.

7. The apparatus of claim 1, wherein the enclosure includes at least one inlet aperture in order to make it possible to introduce fluid into the cavity via the inlet aperture and to enable the fluid to flow out through the fluid-permeable delimiting surface.

8. The apparatus of claim 1, wherein the cavity is divided into at least two smaller cavities by at least one additional fluid-permeable wall, the actively excited acoustic waves being produced in at least one of the two smaller cavities.

9. The apparatus of claim 1, wherein at least one additional sound producer is arranged proximate the at least two smaller cavities so that different actively excited acoustic waves can be produced in the at least two smaller cavities.

10. The apparatus of claim 1, wherein the volume is elongated in a rotationally symmetrical manner and along an axis of symmetry and the fluid can flow through the volume generally in a direction of the axis of symmetry, and the cavity delimits the volume radially at least in one rotational angle by means of the fluid-permeable delimiting surface, the sound producer being arranged proximate the cavity in one of the upstream and downstream ends of the cavity.

11. The apparatus of claim 1, wherein the fluid-permeable delimiting surface includes apertures, arranged on one of a circle and a circular arc oriented perpendicular to the axis of symmetry.

12. A method for damping acoustic waves using a damping apparatus that includes a cavity enclosed by delimiting surfaces within a volume of fluid, one of the delimiting surfaces being permeable to fluid, in order to enable fluid to be exchanged with the volume, comprising:

producing actively excited acoustic waves in the fluid disposed in the cavity using a sound producer; and then
damping the acoustic waves in the volume via the actively excited acoustic waves,
wherein the actively excited acoustic waves are excited regardless of the phase and frequency of the acoustic waves to be damped.

13. The method of claim 12, wherein the actively excited acoustic waves are excited by one of a loud speaker, an ultrasonic transducer, and a piezo-element.

14. The method of claim 12, further comprising actively exciting acoustic waves using a flow of fluid over an aerophonic sound producing element, including one of at least one tongue capable of vibrating and an element that divides a fluid flow to produce a sound.

15. The method according to claim 12, further comprising producing a cavity resonance in the cavity producing the actively excited acoustic waves.

16. The method of claim 12, further comprising:
measuring the actively excited acoustic waves using at least one sound sensor; and then
regulating the excitation of the actively excited acoustic waves as a function of measurement signals from the at least one sound sensor in order to maintain one of the cavity resonance and a pre-specified frequency.

17. The method of claim 12, wherein the damping apparatus includes at least one inlet aperture to allow fluid to enter the cavity through the inlet aperture, flow through the cavity, and to be conducted into the volume through the fluid-permeable delimiting surface.

18. The method of claim 12, wherein the cavity is divided into at least two smaller cavities using at least one additional fluid-permeable wall whereby fluid is allowed to be exchanged between the smaller cavities and the volume, and the actively excited acoustic waves are produced in at least one of the two smaller cavities.

19. The method of claim 18, wherein different actively excited acoustic waves are excited in the at least two smaller cavities.

20. The method of claim 12, wherein the volume is at least part of a combustion chamber in a fan engine and a main flow of fluid flows through it in a main flow direction.

21. The method of claim 12, wherein the actively excited acoustic waves are excited at one of an upstream and a downstream end of the cavity with respect to the main flow direction.

22. The method of claim 21, wherein a bypass flow enters the cavity at an upstream side thereof and causes the active excitation of the actively excited acoustic waves in the cavity, flows through the cavity, and flows out of the fluid-permeable delimiting surface thereby cooling the fluid-permeable delimiting surface.

23. The method of claim 12, wherein the actively excited acoustic waves are monofrequently excited regardless of the phase and frequency of the acoustic waves to be damped.

* * * * *